United States Patent
Tsuchimoto et al.

(10) Patent No.: US 6,760,156 B2
(45) Date of Patent: Jul. 6, 2004

(54) PROCESS OF PRODUCING A POLARIZER, POLARIZER, POLARIZING PLATE, AND VISUAL DISPLAY

(75) Inventors: Kazuki Tsuchimoto, Ibaraki (JP); Seiji Kondo, Ibaraki (JP); Akihiro Nishida, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/246,543

(22) Filed: Sep. 19, 2002

(65) Prior Publication Data

US 2003/0067683 A1 Apr. 10, 2003

(30) Foreign Application Priority Data

Sep. 20, 2001 (JP) ........................................ 2001-286043

(51) Int. Cl.$^7$ ................................................. G02B 5/30
(52) U.S. Cl. ...................... 359/492; 359/483; 359/485; 359/494; 359/500
(58) Field of Search ................................. 359/483, 485, 359/492, 494, 500; 264/131

(56) References Cited

U.S. PATENT DOCUMENTS 5,677,024 A * 10/1997 Abe et al. .................. 428/40.1

FOREIGN PATENT DOCUMENTS

| JP | 8-240715 | 9/1996 |
| JP | 10288709 | * 10/1998 |
| JP | 10-288709 | 10/1998 |
| JP | 11-49878 | 2/1999 |

* cited by examiner

Primary Examiner—Audrey Chang
Assistant Examiner—Craig Curtis
(74) Attorney, Agent, or Firm—Westerman, Hattori, Daniels & Adrian, LLP

(57) ABSTRACT

A polarizer provide that has a high polarization degree and a high transmittance, which is made of a polyvinyl alcohol film, may be produced by a process of producing, comprising the steps of: subjecting a non-stretched polyvinyl alcohol film to uniaxial dry stretching treatment to give a stretch ratio of 4 times or less, dyeing the film, and then subjecting the film to uniaxial stretching treatment to give a stretch ratio of less than 1.5 times under the condition containing a boron compound.

14 Claims, No Drawings

PROCESS OF PRODUCING A POLARIZER, POLARIZER, POLARIZING PLATE, AND VISUAL DISPLAY

BACKGROUND OF THE INVENTION

1. Field of the Invention

The present invention relates to a process of producing a polarizer and a polarizer obtained by the process concerned. And the present invention relates to a polarizing plate using the polarizer concerned. Furthermore, a visual display, such as a liquid crystal display, an organic EL display, a PDP (plasma display panel), using the polarizing plate concerned.

2. Description of the Prior Art

Heretofore, as a polarizer used in a liquid crystal display or the like, a polyvinyl alcohol film dyed with iodine has been used since the polarizer has both of a high transmittance and a high polarization degree. The polarizer is usually used as a polarizing plate laminating, on its single side or both sides, a protective film such as the films made of triacetylcellulose. In recent years, higher performance has been required for liquid crystal display. Thus, a higher transmittance and a higher polarization degree have been required for polarizers. Various polarizer-producing processes, which comply with such requests, are suggested.

There is suggested, for example, a process of subjecting a polyvinyl alcohol film to uniaxial dry stretching, dyeing the film and then dipping the film in an aqueous solution containing boric acid of 70 to 85° C. temperature (JP-A-8-240715). However, according to this production process, a polarizer having a sufficiently high polarization degree has not yet been produced. Furthermore, the following processes are suggested; processes of performing stretching treatment at two stages and further performing the stretching treatment at the second stage in a treating bath containing a boron compound, for example, a process of stretching a polyvinyl alcohol film 4 times or less uniaxially in dry, dyeing the film and further stretching the film 1.5 times or more under the condition containing a boron compound (JP-A-10-288709), and a process of stretching a polyvinyl alcohol film 4 to 8 times uniaxially in dry, dyeing the film, and then stretching the film 1.1 to 1.8 times in an aqueous boric acid solution (JP-A-11-49878). According to such processes, a polarizer having a considerably high polarization degree can be obtained. However,a higher polarization degree is required for polarizers. When the stretch ratio at the second stage in the treating bath containing the boron compound is made large to keep the polarization degree high in such processes, the stretched film is broken easily. Therefore, a polarizer having a high polarization degree cannot be stably obtained.

An object of the present invention is to provide a process of producing stably a polarizer that has a high polarization degree and a high transmittance, which is made of a polyvinyl alcohol film.

And other object of the present invention is to provide a polarizer obtained by the producing process, a polarizing plate utilizing the polarizer and further a visual display utilizing the polarizing plate.

SUMMARY OF THE INVENTION

As a result of repeated examinations carried out wholeheartedly by the present inventors to solve the above-mentioned problems, a process of producing a polarizer shown below was found out and the present invention was completed.

The present invention relates to a process of producing a polarizer, comprising the steps of:

subjecting a non-stretched polyvinyl alcohol film to uniaxial dry stretching treatment to give a stretch ratio of 4 times or less, dyeing the film, and then subjecting the film to uniaxial stretching treatment to give a stretch ratio of less than 1.5 times under the condition containing a boron compound.

In the present invention, the stretch ratio in the dry stretching (the first stretch ratio) is controlled to 4 times or less and the stretch ratio in the stretching under the condition containing the boron compound (the second stretch ratio) is controlled to less than 1.5 times, so that the total stretch ratio (the product of the first stretch ratio in the dry stretching and the second stretch ratio in the stretching under the condition containing the boron compound) is adjusted to less than 6. In this way, a polarizer having a high polarization degree and a high transmittance is stably produced. The first stretch ratio in the dry stretching is preferably from 3 to 4 times, and the second stretch ratio in the stretching under the condition containing the boron compound is preferably 1.45 times or less. The total stretch ratio is preferably from 4.5 to less than 6 times. The first stretch ratio and the second stretch ratio are controlled outside the above-mentioned ranges, whereby the total stretch ratio can be adjusted to less than 6 times. However, when the first stretch ratio in the dry stretching is set to more than 4 times, a polarizer having a sufficiently high polarization degree cannot be obtained. When the second stretch ratio in the stretching under the condition containing the boron compound is set to 1.5 or more, the stretched film is liable to break.

In the above-mentioned process of producing a polarizer, when the uniaxial stretching treatment is performed under the condition containing the boron compound, the shape ratio (the film MD direction size /the film TD direction size) of the film to be subjected to the uniaxial stretching treatment is preferably set to 1.2 or more. By setting the shape ratio to 1.2 or more, a polarizer having a high polarization degree can stably be obtained. The shape ratio is preferably set to 1.5 or more. The shape ratio is set to about 10 or less from the viewpoint of the size of the treating bath.

In the above-mentioned process of producing a polarizer, the transmittance of the polarizer is preferably 43% or more and the polarization degree thereof is preferably 96% or more. The polarizer having the transmittance of 43% or more perform good optical properties. In order to make the optical properties better, the polarization degree is more preferably 96% or more; further preferably 97% or more.

And the present invention relates to a polarizer obtained by the above described process.

And the present invention relates to a polarizing plate with which an optical transparent protective layer is prepared at least in one side of the above described polarizer.

In the above-mentioned polarizing plate, comprising at least one of a retardation plate, a viewing angle compensation film, a reflective plate, a transflective plate and a brightness enhancement film, is used.

Furthermore, the present invention relates to a visual display using the above-described polarizing plate.

DETAIL DESCRIPTION OF THE INVENTION

Polyvinyl alcohols or derivatives thereof are used for a material of a non-stretched film in a process of producing a polarizer of the present invention. As derivatives of polyvinyl alcohol, in addition to polyvinyl formals, polyvinyl acetals, etc. may be mentioned, and derivatives modified with olefins, such as ethylene and propylene; unsaturated carboxylic acids, such as acrylic acid, methacrylic acid, and crotonic acid; alkyl esters of the above described unsaturated carboxylic acids and acrylamide etc. may be mentioned. Generally, polyvinyl alcohol with approximately 1000 to 10000 of degree of polymerization and approximately 80 to 100 mol % of degree of saponification is used.

In addition, additives, such as plasticizers, may also be contained in the above described polyvinyl alcohol film. As plasticizers, polyols and condensates thereof, etc., for example, glycerin, diglycerin, triglycerin, ethylene glycol, propylene glycol, polyethylene glycols, etc. may be mentioned. Although an amount of the plasticizers used is not especially limited, it is preferable to be set no more than 20% by weight in the non-stretched film.

The polyvinyl alcohol film (non-stretched film) is subjected to dry stretching to give a stretch ratio of 4 times or less, so as to produce a stretched film. The method of the uniaxial dry stretching treatment is not particularly limited. For example, any one selected from the following methods may be adopted; a method described in Japanese Patent No. 1524033, a method described in Japanese Patent No. 2731813, a method of subjecting a film to stretching treatment while applying tension thereto from between rolls set inside or outside a dry oven, a method of using heating rolls to perform stretching treatment, a method of using a tenter stretching machine to perform stretching treatment, and so on. In the stretching means, the non-stretched film is usually heated to about 70 to 150° C. As the non-stretched film, a film having a thickness of about 30 to 150 μm is usually used.

Next, the stretched film is subjected to dyeing treatment. Causing the adsorption and orientation of iodine or dichroism dyestuff onto the stretched film performs the dyeing treatment. Dipping the stretched film into a dyeing solution generally performs the dyeing treatment. The dyeing solution is generally an iodine solution. An aqueous iodine solution used as the iodine solution is an aqueous solution that contains iodine and iodine ions from, for example, potassium iodide as a dissolving auxiliary. The concentration of iodine is from about 0.01 to 0.5% by weight, preferably from 0.02 to 0.04% by weight. The concentration of potassium iodide is from approximately 0.01 to 10% by weight, preferably from 0.02 to 8% by weight.

In the dyeing treatment with iodine, the temperature of the iodine solution is usually from about 20 to 50° C., preferably from 25 to 40° C. The time of the dipping is usually from approximately 10 to 300 seconds, preferably from 20 to 240 seconds. The iodine content in the polyvinyl alcohol film (stretched film) is usually adjusted to about 1 to 4% by weight, preferably 1.5 to 3.5% by weight, in order to cause the polarizer to exhibit a good polarization degree. In the dyeing treatment with iodine, it is preferred to adjust the iodine content in the polyvinyl alcohol film within the above-mentioned range by adjusting conditions such as the concentration of the iodine solution, the temperature of the dipping of the polyvinyl alcohol film into the iodine solution and the time of the dipping.

Next, the film is subjected to uniaxial stretching treatment to give a stretch ratio of less than 1.5 times under the condition containing boron compound. Examples of the boron compound include boric acid and borax. The boron compound is used in the form of an aqueous solution or a mixed solution of water and an organic solvent. The concentration of boric acid in the aqueous boric acid solution or the like is from about 2 to 20% by weight, preferably from 3 to 15% by weight. Iodine ions may be incorporated into the aqueous boric acid solution or the like, using potassium iodide. The aqueous boric acid solution or the like containing potassium iodide makes it possible to supply a slightly-colored polarizer, that is, a polarizer in the so-called neutral gray, which has a substantially constant absorbance over almost all of visible ray wavelengths. Dipping the stretched film into the aqueous boric acid solution or the like generally performs the treatment with the boron compound. The treatment with the boron compound may be performed by a coating method, a spray method or the like.

The treatment temperature in the treatment with the boron compound is usually 50° C. or more, preferably from 50 to 85° C. The time of the treatment with the boron compound is usually from 10 to 800 seconds, preferably from 30 to 500 seconds.

The stretched film in the course of the treatment with the boron compound is subjected to uniaxial stretching treatment in such a manner that the stretch ratio will be 1.5 times or less. At this time, the shape ratio (the film MD direction size/the film TD direction size) of the film to be subjected to the uniaxial stretching treatment is preferably set to 1.2 or more. The stretching in the course of the treatment with the boron compound may be performed at two ore more stages if the stretch ratio is less than 1.5 times. The method of the uniaxial stretching treatment in this step is not particularly limited.

The film MD direction size and the film TD direction size, from which the shape ratio of the stretched film can be calculated, are the film MD direction size and the film TD direction size, respectively, of the stretched film that is in a state that the stretched film is to be uniaxially stretched. For example, in the case in which the uniaxial stretching treatment is performed in a batch manner, the film MD direction size and the film TD direction size are the film MD direction size and the film TD direction size, respectively, at the time of chucking the film. In the case in which the uniaxial stretching treatment is continuously performed using a velocity difference between pinch rollers, the pass length between the pinch rollers corresponds to the film MD direction size and the film width of the pinch roller at an inlet corresponds to the film TD direction size.

The polyvinyl alcohol film (stretched film) subjected to the respective treatments is subjected to water-washing treatment and drying treatment in a usual manner, thereby producing a polarizer.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

A hard coat layer may be prepared, or antireflection processing, processing aiming at sticking prevention, diffusion or anti glare may be performed onto the face on which the polarizing film of the above described transparent protective film has not been adhered (the face without the above described application layer thereon).

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 $\mu$m, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 $\mu$m.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness maybe controlled more effectively, as a result that an incident light and its reflected light that is transmitted through the film are diffused. A reflective layer with fine concavo-convex structure on the surface effected by a surface fine concavo-convex structure of a protective film maybe formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarization plate may be used as elliptically polarization plate or circularly polarization plate on which the retardation plate is laminated. A description of the above-mentioned elliptically polarization plate or circularly polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives maybe preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarization plate top or a optical film top using suitable developing methods, such as flow method and coating method, or a method in which an adhesive layer is once formed on a separator, as mentioned above, and is then transferred on a polarization plate or an optical film may be mentioned.

An adhesive layer may also be prepared on one side or both sides of a polarization plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarization plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarization plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention will be specifically described by way of Examples and Comparative Examples. In these examples, the "%" represents "% by weight".

Example 1

A polyvinyl alcohol film (average polymerization degree: 2400, and saponification degree: 99.9%) having a thickness of 75 $\mu$m was uniaxially stretched to give a stretch ratio of 3 times in a heating oven of 100° C. temperature. Next, the film was dipped in an aqueous iodine solution having a potassium iodide concentration of 0.3% and an iodine concentration of 0.05% at 30° C. for 60 seconds, so as to be dyed. Thereafter, the film was set up between chucks in the state that the shape ratio (the film MD direction size/the film TD direction size) was 1.6 in a 10% aqueous boric acid solution of 65° C. temperature. While the film was uniaxially stretched to give a stretch ratio of 1.4 times in a batch manner, the film was dipped therein for 1 minute. Thereafter, the film was washed with pure water of 25° C. temperature for 10 seconds, and then dried at 60° C. for 4 minutes. And a polarizer was obtained.

Example 2

A polyvinyl alcohol film (average polymerization degree: 2400, and saponification degree: 99.9%) having a thickness of 75 $\mu$m was uniaxially stretched to give a stretch ratio of 3.5 times while the film was brought into contact with a heating roller of 100° C. temperature. Next, the film was dipped in an aqueous iodine solution having a potassium iodide concentration of 0.3% and an iodine concentration of 0.05% at 30° C. for 60 seconds, so as to be dyed. Thereafter, the film was set up between chucks in the state that the shape ratio (the film MD direction size/the film TD direction size) was 2 in a 10% aqueous boric acid solution of 65° C. temperature. While the film was uniaxially stretched to give a stretch ratio of 1.4 times in a batch manner, the film was dipped therein for 1 minute. Thereafter, the film was washed with pure water of 25° C. temperature for 10 seconds, and then dried at 60° C. for 4 minutes. And a polarizer was obtained.

Example 3

A polyvinyl alcohol film (average polymerization degree: 2400, and saponification degree: 99.9%) having a thickness of 75 $\mu$m was uniaxially stretched to give a stretch ratio of 3.5 times while the film was brought into contact with a heating roller of 100° C. temperature. Next, the film was dipped in an aqueous iodine solution having a potassium iodide concentration of 0.3% and an iodine concentration of 0.05% at 30° C. for 60 seconds, so as to be dyed. Thereafter, the film was set up between chucks in the state that the shape ratio (the film MD direction size/the film TD direction size) was 1 in a 10% aqueous boric acid solution of 65° C. temperature. While the film was uniaxially stretched to give a stretch ratio of 1.4 times in a batch manner, the film was dipped therein for 1 minute. Thereafter, the film was washed with pure water of 25° C. temperature for 10 seconds, and then dried at 60° C. for 4 minutes. And a polarizer was obtained.

Comparative Example 1

A polyvinyl alcohol film (average polymerization degree: 2400, and saponification degree: 99.9%) having a thickness of 75 $\mu$m was uniaxially stretched to give a stretch ratio of 5 times while the film was brought into contact with a heating roller of 100° C. temperature. Next, the film was dipped in an aqueous iodine solution having a potassium iodide concentration of 0.3% and an iodine concentration of 0.05% at 30° C. for 60 seconds, so as to be dyed. Thereafter, the film was set up between chucks in the state that the shape ratio (the film MD direction size/the film TD direction size) was 1 in a 10% aqueous boric acid solution of 65° C. temperature. While the film was uniaxially stretched to give a stretch ratio of 1.2 times in a batch manner, the film was dipped therein for 1 minute. Thereafter, the film was washed with pure water of 25° C. temperature for 10 seconds, and then dried at 60° C. for 4 minutes. And a polarizer was obtained.

Comparative Example 2

A polyvinyl alcohol film (average polymerization degree: 2400, and saponification degree: 99.9%) having a thickness of 75 μm was uniaxially stretched to give a stretch ratio of 3.5 times while the film was brought into contact with a heating roller of 100° C. temperature. Next, the film was dipped in an aqueous iodine solution having a potassium iodide concentration of 0.3% and an iodine concentration of 0.05% at 30° C. for 60 seconds, so as to be dyed. Thereafter, the film was set up between chucks in the state that the shape ratio (the film MD direction size/the film TD direction size) was 1 in a 10% aqueous boric acid solution of 65° C. temperature. The film was attempted to be uniaxially stretched to give a stretch ratio of 2 times in a batch manner and was simultaneously attempted to be dipped therein for 1 minute. However, the film was broken in the course of the stretching.

The polarizers obtained in Examples and Comparative Examples were evaluated as follows. The results are shown in Table 1.

(Light Transmittance)

A spectrophotometer (CMS-500, made by Murakami Color Research Laboratory) was used to measure the transmittance of a polarizer. The transmittance of the polarizer is a Y value subjected to relative spectral responsively correction based on 2-degree visual field (C light source) described in JIS Z 8701.

(Polarization Degree)

The spectrophotometer was used to measure the transmittance ($H_0$) in the case in which two polarizers, which were the same, were overlapped with each other in such a manner that their polarizing axes would be in parallel and the transmittance ($H_{90}$) in the case in which the two polarizers were overlapped with each other in such a manner that their polarizing axes would be orthogonal. The polarization degree was calculated from the following equation:

Polarization degree (%)={$(H_0-H_{90})/(H_0+H_{90})$}×100

The parallel transmittance ($H_0$) and the orthogonal transmittance ($H_{90}$) were Y values subjected to relative spectral responsivity correction based on 2-degree visual field (C light source).

TABLE 1

|  | Transmittance | Polarization degree |
|---|---|---|
| Example 1 | 43.5 | 97.8 |
| Example 2 | 43.6 | 98.5 |
| Example 3 | 43.5 | 96.2 |

TABLE 1-continued

|  | Transmittance | Polarization degree |
|---|---|---|
| Comparative Example 1 | 43.1 | 95.3 |
| Comparative Example 2 | Break | Break |

What is claimed is;

1. A process of producing a polarizer, comprising the steps of:

subjecting a non-stretched polyvinyl alcohol film to uniaxial dry stretching treatment to give a stretch ratio of 4 times or less, dyeing the film, and then subjecting the film to uniaxial stretching treatment to give a stretch ratio of less than 1.5 times in the course of a treatment with a boron compound.

2. The process according to claim 1, wherein a shape ratio (dimension in a stretching direction/dimension in a direction transverse to the stretching direction) of the film to be subjected to the uniaxial stretching treatment, which is performed in the course of a treatment with the boron compound, is set to 1.2 or more.

3. The process according to claim 1, wherein the transmittance of the polarizer is 43% or more, and the polarization degree thereof is 96% or more.

4. A polarizer obtained by the process according to claim 1.

5. A polarizing plate with an optical transparent protective layer on at least one side of the polarizer according to claim 4.

6. The polarizing plate according to claim 5, comprising a retardation plate.

7. The polarizing plate according to claim 5, comprising a viewing angle compensation film.

8. The polarizing plate according to claim 5, comprising a reflective plate.

9. The polarizing plate according to claim 5, comprising a transflective plate.

10. The polarizing plate according to claim 5, comprising a brightness enhancement film.

11. A visual display using the polarizing plate according to any one of claims 5–6 and 7–10.

12. The process according to claim 1, wherein the stretch ratio in the course of a treatment with a boron compound is 1.45 times or less.

13. The process according to claim 1, wherein a total stretch ratio is from 4.5 to less than 6 times.

14. The process according to claim 1, wherein the stretch ratio in the course of a treatment with a boron compound is 1.4 times or less.

* * * * *